United States Patent [19]

Sayer

[11] Patent Number: 5,001,741
[45] Date of Patent: Mar. 19, 1991

[54] APPARATUS FOR TESTING AND SPARING LINECARD EQUIPMENT IN A TELECOMMUNICATIONS EXCHANGE

[75] Inventor: Michael J. Sayer, Coventry, Great Britain

[73] Assignee: GEC Plessey Telecommunications Limited, Coventry, England

[21] Appl. No.: 438,208

[22] Filed: Nov. 20, 1989

[30] Foreign Application Priority Data

Mar. 9, 1989 [GB] United Kingdom ............... 8905376

[51] Int. Cl.$^5$ .................... H04Q 1/20; H04M 3/26
[52] U.S. Cl. ................................. 379/12; 379/15; 379/27
[58] Field of Search ............. 379/9, 15, 16, 17, 12, 379/19, 22, 27, 29

[56] References Cited

U.S. PATENT DOCUMENTS 4,393,491 7/1983 Ashlock et al. ............... 370/13
4,451,708 5/1984 Kemler et al. ............... 379/27

Primary Examiner—Stafford D. Schreyer
Attorney, Agent, or Firm—Fleit, Jacobson, Cohn, Price, Holman & Stern

[57] ABSTRACT

Each wire of a subscriber's line is connected to its associated input of a subscriber's line unit by two interconnected relay contact sets. The relay contact sets are also connected to test busses. If a subscriber's line unit becomes faulty, a spare subscriber's line unit can be switched in to replace the faulty unit. The connection path is made by way of the test busses and the relay contact sets associated with the respective units. Test access paths may also be provided from the busses to the units.

3 Claims, 2 Drawing Sheets

APPARATUS FOR TESTING AND SPARING LINECARD EQUIPMENT IN A TELECOMMUNICATIONS EXCHANGE

FIELD OF THE INVENTION

The present invention relates to apparatus for testing and sparing linecard equipment in a telecommunications exchange.

The present invention finds application in digital telecommunications exchanges such as those commonly known as System X telecommunications exchanges.

DESCRIPTION OF THE PRIOR ART

In such telecommunications exchanges each subscriber is connected to the exchange by two wires to a subscriber line unit in which is housed the linecard equipment. Each subscriber line unit is provided with two inputs A and B, to which is connected a respective one of the subscriber's two wires. The connection is made by way of access relay contact sets.

The desire for greater reliability and availability of service has led to the need to be able to replace a faulty subscriber line unit by a spare unit. This function is known as sparing. FIG. 1 shows a known arrangement for testing and sparing the linecard equipment. For clarity only the A connections are shown. In practice all relay contact sets are dual changeover to handle both wires. A subscriber, SUB1 is connected to the subscriber line unit SLU1 by way of relay contact sets RL1 and RL2, provides a normal subscriber connection. One of the contacts of relay contact sets RL1 and RL2 are connected to a respective test bus, TBA and TBB. Similarly, subscriber SUB2 is connected to subscriber line circuit SLU2 by way of relay contact sets RL3 and RL4, which have respective contacts connected to the respective test busses, TBA and TBB. However, it is assumed in this case that the unit SLU2 is faulty and the relay contact set RL3 is shown in the state which disconnects the unit from subscriber SUB2 and connects the subscriber to the A test bus TBA for connection to the spare unit SLU3. The unit SLU3 is not dedicated to a subscriber, but is connected to the test busses TBA, TBB by respective relay contact sets RL5 and RL6. Relay contact set RL6 is shown connecting the test bus TBB to the unit SLU3. In order to connect the subscriber SUB2 to the spare unit SLU3, a further relay contact set RL7 has to be provided which connects the test busses TBA, TBB, together, and the connection is made by way of relay contact set RL3, test bus TBA, relay contact set RL7, test bus TBB and relay contact set RL6.

A problem exist with the above arrangement in that to be able to routinely test the subscriber line units without interrupting the service, an eight wire bus would be required to enable the subscriber to be switched to a spare unit and then perform test on the original unit.

STATEMENT OF THE OBJECT OF THE INVENTION

An object of the present invention is to provide apparatus which overcomes the need for extra busses, and which removed the need for a relay contact set for connecting the test busses together.

According to the present invention there is provided apparatus for testing and sparing linecard equipment in a telecommunications exchange, to which are connected a plurality of subscriber's two-wire lines, wherein each wire of the subscriber's line is connected to an associated subscriber's line unit containing the linecard equipment by first and second relay contact sets which in dependence upon their operated state, connect the subscriber's line to its associated unit or disconnects the wire of the subscriber's line from its associated unit and connects the wire of the subscriber's line to a spare unit by way of said first relay contact set and first and second relay contact sets associated with the spare unit.

BRIEF DESCRIPTION OF THE DRAWINGS

An embodiment of the invention will now be described with reference to the accompanying drawings, in which.

DESCRIPTION OF THE PREFERRED EMBODIMENT

Figure 2:
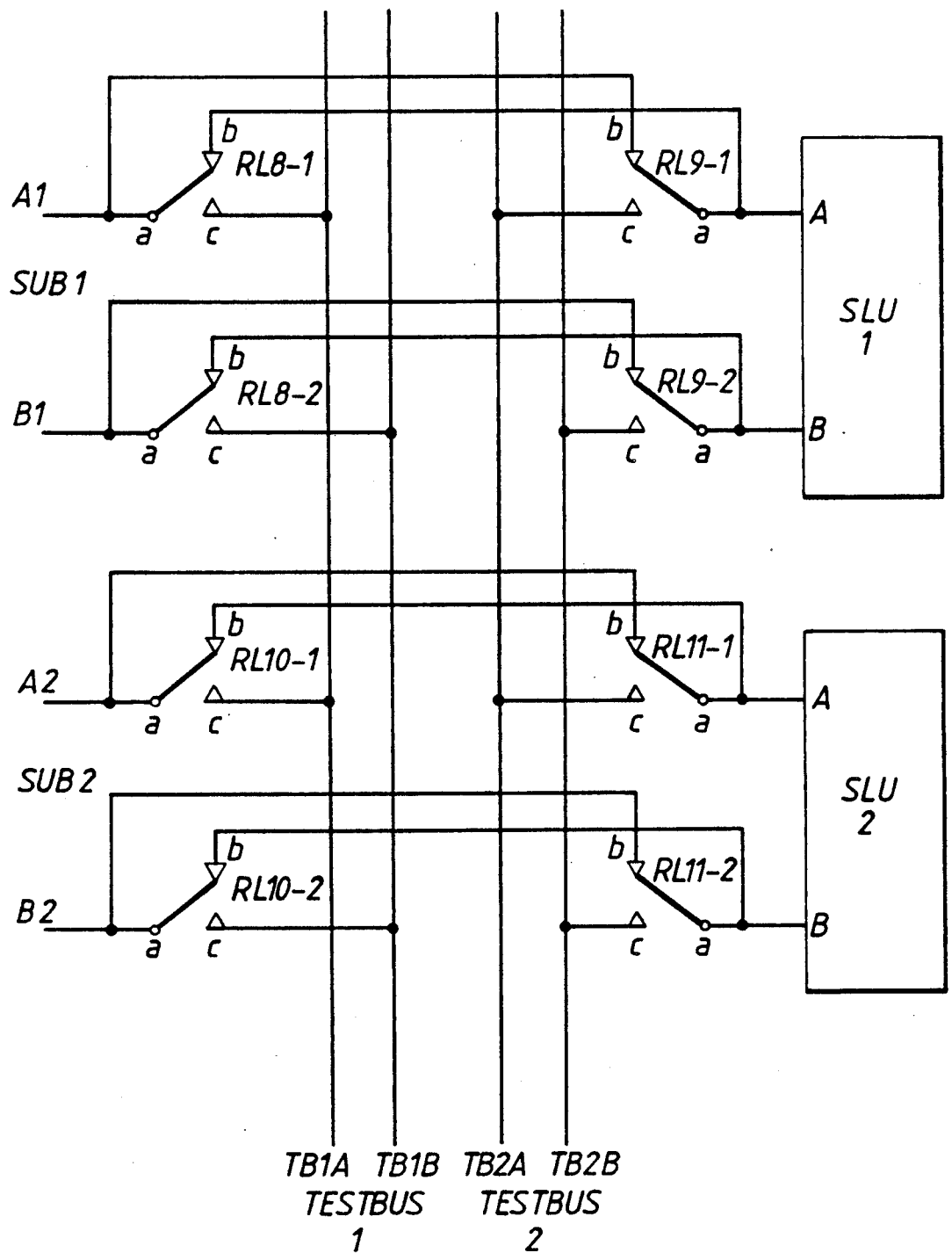

Referring to FIG. 2, two typical subscriber line units SLU1 and SLU2 are shown. All relays are dual change over and shown in their non-operated states. The relay contact set RL8-1 has its contact c connected to test bus TB1A, its contact b connected to the A input of unit SLU1, and its moving blade contact a connected to the A1 wire of subscriber SUB1. Relay contact set RL9-1 has its contact c connected to the test bus TB2A, its contact b connected to the A1 wire of subscriber SUB1, and its moving blade contact a connected to the A input of unit SLU1.

The relay contact set RL8-2 has its contact c connected to test bus TB1B, its contact b connected to the B input of unit SLU1, and its moving blade contact a connected to the B1 wire of subscriber SUB1. The relay contact set RL9-2 has its contact c connected to the test bus TB2B, its contact b connected to the B1 wire of subscriber SUB1, and its moving blade contact a connected to the B input of unit SLU1.

It will be realised that the relay contact sets RL10-1, RL10-2, RL11-1 and R11-2 are connected in the same manner as above, except that the connections are in respect of the wires A2, B2 of subscriber SUB2 and the A and B inputs of unit SLU2.

Under normal operating conditions, all relays are in the non-operated state as shown to give the following connections:

A1-SLU1A
B1-SLU1B
A2-SLU2A
B2-SLU2B

To test unit SLU1 and the line wires A1 and B1 of subscriber SUB1, relay contact sets RL8-1, RL8-2, RL9-1 and RL9-2 are operated only, to give the following connections:

A1-TB1A
B1-TB1B
TB2A-SLU1A
TB2B-SLU1B

To test unit SLU2 and the line wires A2 and B2 of subscriber SUB2, relay contact sets RL10-1, RL10-2, RL11-1 and R11-2 are operated only, to give the following connections:

A2-TB1A

B2-TB1B
TB2A-SLUZA
TB2B-SLU2B

Therefore, the subscribers lines and the subscriber line units can be tested by way of a test bus.

By operating relay contact sets RL8-1, RL8-2, RL9-1, RL9-2, RL10-1 and RL10-2 and assuming no subscriber is connected to wires A2 and B2, a spare unit SLU2 is provided while unit SL1 is tested. The connections are as follows:

A1-TB1A-SLU2A
B1-TB1B-SLU2B
TB2A-SLU1A
TB2B-SLU1B

Therefore, the unit SLU1 can be tested by way of test bus 2, and the unit SLU2 provides a spare service for subscriber SUB1.

It will readily be appreciated that in practice any member of subscribers can be provided with a respective relay connection arrangement connecting it to an associated subscriber line interface unit. Also spare units, together with respective relay connection arrangements not connected to any subscriber can be provided, and by operation of the appropriate relay contact sets will give the switching combinations as described above.

Figure 1:
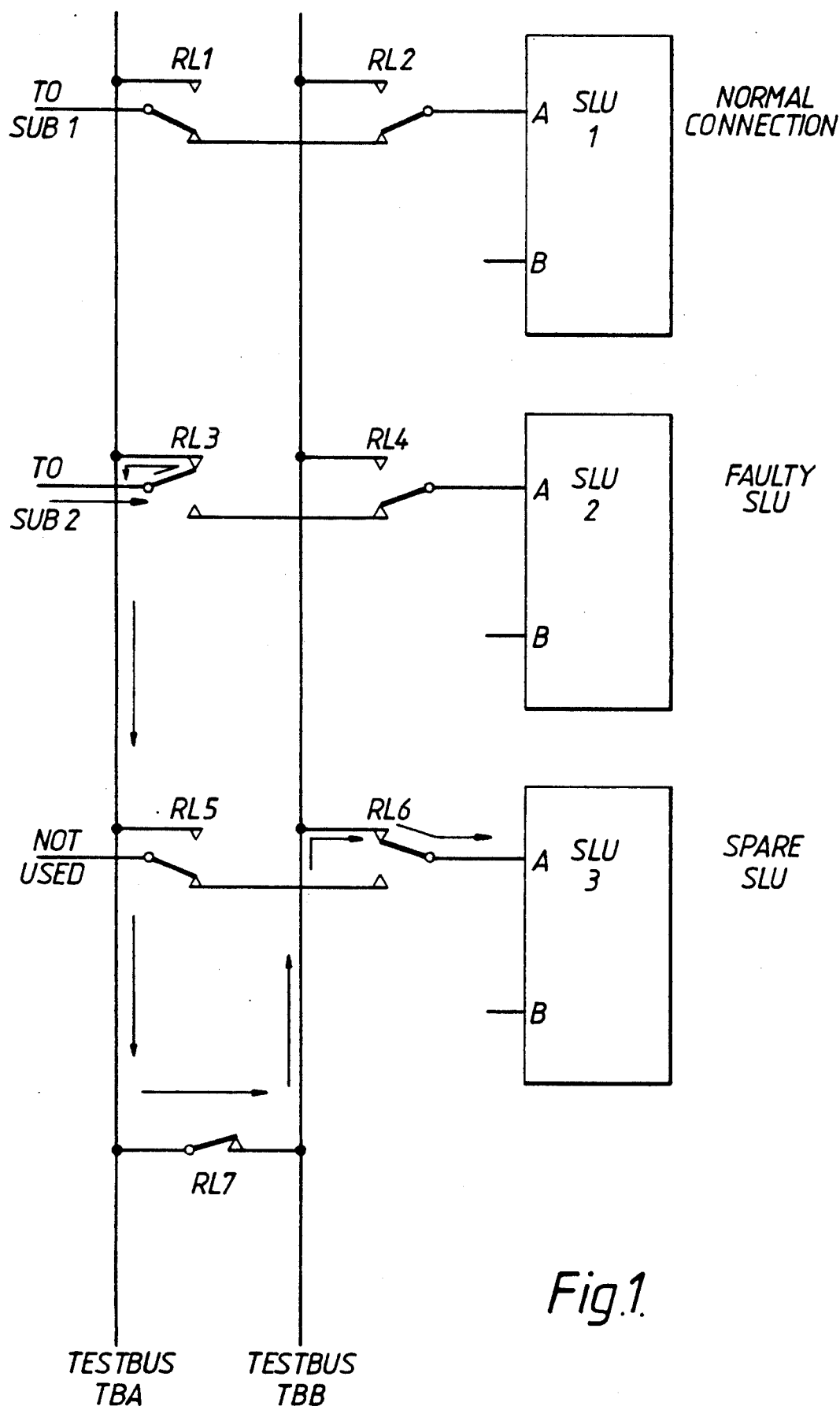
FIG. 1 shows known apparatus and has already been referred to and discussed above; and, FIG. 2 shows apparatus according to the present invention and will be described below.

The test busses TB1A, TB1B, TB2A and TB2B form part of the connections between relay contact sets and the arrangement of the interconnections between relay contact sets is such that the need for an extra relay contact set such as RL7 in FIG. 1 to connect the test busses together is avoided.

The above arrangement conveniently overcomes the problems with that of FIG. 1 by providing normal operation under no fault condition, the ability to switch the subscriber to a spare unit under fault conditions, test the access to the subscriber's line and to the line circuit, and to test the original line circuit while giving normal service by way of the spare unit.

I claim:

1. Apparatus for testing and sparing linecard equipment in a telecommunications exchange, to which are connected a plurality of subscriber's two-wire lines, wherein each wire of the subscriber's line is connected to an associated subscriber's line unit containing the linecard equipment by first and second relay contact sets which in dependence upon their operated state, connects the wire of the subscriber's line to its associated unit or disconnects the wire of the subscriber's line from its associated unit and connects the wire of the subscriber's line to a spare unit by way of said first relay contact sets and first and second relay contact sets associated with the spare unit, the first relay contact sets have one contact permanently connected to a respective wire of a first two wire test bus, and the second relay contact sets have one contact permanently connected to a respective wire of a second two wire test bus and each first and second relay contact sets have a contact connected to a respective wire of the subscriber's line.

2. Apparatus as claimed in claim 1, wherein each first and second relay contact sets has a contact permanently connected to a respective input of an associated unit.

3. Apparatus as claimed in claim 2, wherein the first test bus is used in the connection of the first and second wires of a subscriber's line to the spare unit, and the first and second wires of the second test bus are connected to respective inputs of the unit to be tested.

* * * * *